United States Patent [19]

Takano et al.

[11] Patent Number: 4,781,658
[45] Date of Patent: Nov. 1, 1988

[54] POWER TRANSMISSION MECHANISM

[75] Inventors: Hiroshi Takano, Miki; Shinichi Takagi, Hyogo; Akihiro Fujita, Kobe, all of Japan

[73] Assignee: Mitsuboshi Belting Ltd., Kobe, Japan

[21] Appl. No.: 457,466

[22] Filed: Jan. 12, 1983

[30] Foreign Application Priority Data

Feb. 12, 1982 [JP] Japan ................................. 57-21482

[51] Int. Cl.⁴ ............................................. F16H 57/04
[52] U.S. Cl. ....................................... 474/91; 474/205
[58] Field of Search .............. 474/91, 153, 205, 249, 474/250

[56] References Cited

U.S. PATENT DOCUMENTS

| 1,294,200 | 2/1919 | Tritton ............................. 474/91 X |
| 1,788,992 | 1/1931 | Ecabert ................................ 474/91 |
| 2,397,312 | 3/1946 | Forrest ............................... 474/153 |
| 3,138,034 | 6/1964 | Dittrich et al. ....................... 74/236 |
| 3,151,491 | 10/1964 | Case ................................ 474/205 X |

FOREIGN PATENT DOCUMENTS

| 2429939 | 1/1980 | France . |
| 2488966 | 2/1982 | France . |
| 76745 | 6/1981 | Japan ................................. 474/205 |
| 853399 | 11/1960 | United Kingdom . |

Primary Examiner—Thuy M. Bui
Attorney, Agent, or Firm—Wood, Dalton, Phillips, Mason & Rowe

[57] ABSTRACT

A power transmission mechanism (10) having a V-belt (11) provided with transverse reinforcing elements (22). The V-belt, in the illustrated embodiment, defines a cog belt wherein the reinforcing elements are disposed within the cogs (15) thereof to have opposite end surfaces (23) exposed at the side edge surfaces (21) of the belt. A thin film of lubricating fluid (27) is provided on the exposed end surfaces of the reinforcing elements for improved long troublefree operation of the mechanism. Different structures for providing the thin film of lubricating fluid are disclosed. In the illustrated embodiments, the thin film extends along the entire side edge surfaces of the V-belt.

19 Claims, 2 Drawing Sheets

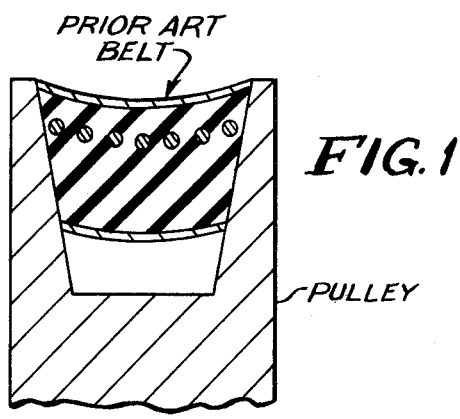
FIG. 1
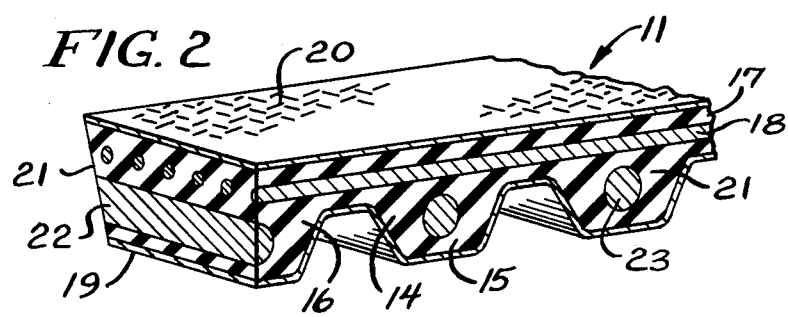
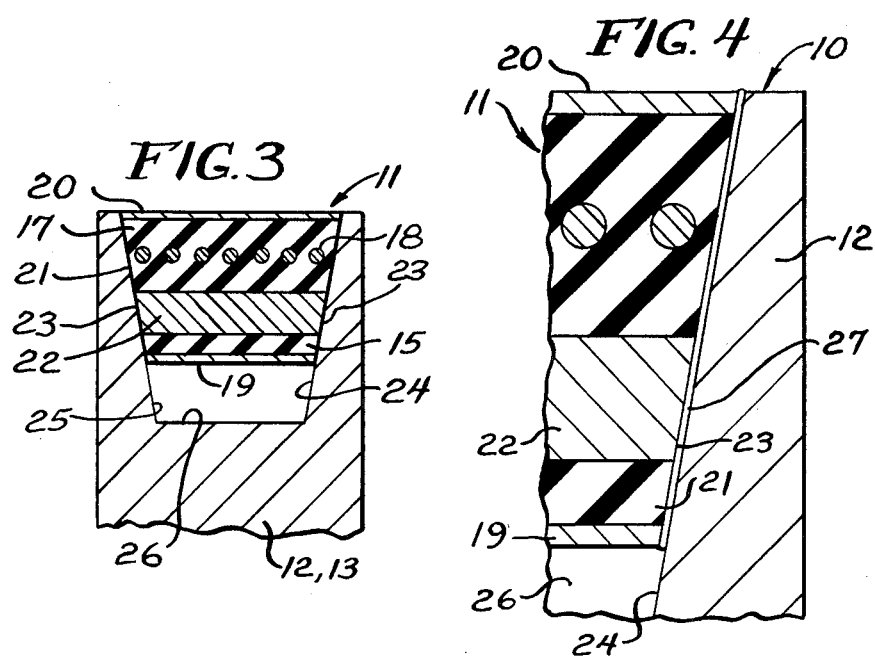

POWER TRANSMISSION MECHANISM

DESCRIPTION

TECHNICAL FIELD

This invention relates to power transmission mechanisms, and in particular to V-belt power transmission mechanisms.

BACKGROUND ART

In one form of V-belt power transmission mechanism, the V-belt is entrained about a driver pulley and a driven pulley so as to have side edge surfaces of the V-belt facially engaged complementary surfaces of the peripheral grooves of the pulleys. In one improved form of such a V-belt power transmission mechanism, the V-belt is provided with cogs in the lower portion thereof, providing improved flexibility and long life.

In such V-belts, there is a tendency for the lower portion of the belt to be deformed downwardly into the pulley groove during the power transmission operation, as illustrated in FIG. 1 of the drawing. This deformation results from a transverse enlargement of the belt resulting from the transmission of the drive forces between the belt and pulley, and one solution to the problem has been to provide in the inner, or compression, portion of the V-belt a plurality of transverse reinforcing fibers or elements.

In the manufacture of such belts, it is common to have the reinforcing fibers or elements exposed at the side edges of the belt where the belt comprises a raw edge belt, i.e. a belt that does not have a covering fabric on the side edges.

As the exposed ends of the reinforcing fibers or elements may engage the confronting sidewalls of the pulley grooves, wear of the sidewalls has resulted, thereby causing a number of problems in the prior art belts.

The engagement of the reinforcing element with the pulley sidewall surfaces increases the friction between the belt and pulley. The engagement tends to wear the pulley surface so as to develop circumferentially extending concavities adversely affecting the power transmission of the mechanism.

Such wear further makes it difficult to properly fit the belt in the pulleys and presents a problem in removal of the belt from the pulley, as during service and maintenance in that the concavities tend to prevent ready free withdrawal of the belt from the worn groove.

The wear of the pulley further causes the belt pitch line to fluctuate, thereby producing nonuniform stresses in the belt, again adversely affecting the useful life of the belt and the power transmitting capabilities thereof.

The engagement of the reinforcing fibers or elements with the pulley sidewall surfaces further has been found to create noise, such as creaks or beats, during the drive operation of the mechanism. In many applications, it is desirable to minimize noise and, thus, the known forms of such mechanisms have presented a serious problem in this regard.

DISCLOSURE OF INVENTION

The present invention comprehends an improved V-belt power transmission including means for providing a thin film of lubricant fluid between the V-belt side surfaces and the pulley groove sidewalls to effectively avoid the above discussed problems of the prior art mechanisms.

In the illustrated embodiment, the lubricant fluid comprises oil and the V-belt is formed of an oil-resistant rubber.

In the illustrated embodiment, the V-belt comprises a cog belt with the reinforcing elements being disposed in the cog.

In the illustrated embodiment, the reinforcing elements comprise metal rods extending fully transversely across the V-belt and having exposed opposite end surfaces confronting the sidewalls of the pulley groove.

In the illustrated embodiment, the lubricant fluid providing means comprising means for continuously delivering the fluid onto the belt during operation of the mechanism.

In another form, the lubricant fluid providing means comprises means for continuously delivering the lubricating fluid onto the pulley during operation of the power transmission mechanism.

In one illustrated embodiment, the lubricant providing means comprises means for directing a stream of the lubricant fluid continuously onto at least one of the belt and pulleys during operation of the power transmission mechanism.

In another form of the invention, the lubricant providing means comprises means for passing at least a portion of the belt through a body of the lubricant fluid during operation of the power transmission mechanism.

The invention further comprehends the provision of lubricant fluid providing means wherein one of the pulleys is caused to pass through the body of the lubricating fluid during operation of the power transmission mechanism.

In the illustrated embodiment, the reinforcing elements comprise metal rods, the V-belt is formed of an oil-resistant rubber, and the lubricating fluid comprises oil.

The lubricant fluid-providing means is arranged to provide a thin film of the lubricant so as to effectively provide optimum power transmission in the operation of the system, while yet effectively preventing wear of the pulley sidewall surfaces, as discussed above.

The power transmission mechanism of the present invention is extremely simple and economical of construction, while yet providing the highly desirable features discussed above.

BRIEF DESCRIPTION OF THE DRAWING

Other features and advantages of the invention will be apparent from the following description taken in connection with the accompanying drawing wherein:

FIG. 1 is a fragmentary cross section of a V-belt power transmission mechanism of the prior art illustrating the deformation of the conventional V-belt in the pulley groove during a power transmission operation;

FIG. 2 is a fragmentary perspective section of a V-belt having a cog portion provided with transversely extending reinforcing elements for use in the V-belt power transmission mechnism of the present invention;

FIG. 3 is a transverse section of the V-belt power transmission mechanism utilizing the grooved V-belt construction of FIG. 2;

FIG. 4 is a fragmentary enlarged transverse section illustrating the provision of a thin film of lubricating fluid between the V-belt edge surfaces and the pulley groove sidewall surfaces in carrying out the invention;

BEST MODE FOR CARRYING OUT THE INVENTION

Figure 5:
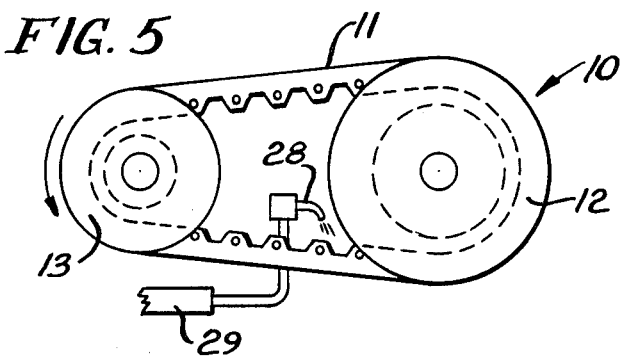
FIG. 5 is a schematic illustration of a V-belt power transmission mechanism illustrating one form of lubricant fluid-providing means embodying the means.

In the illustrative embodiment of the invention as disclosed in the drawing, a V-belt power transmission mechanism generally designated 10 is shown to comprise a V-belt 11 entrained about a driving pulley 12 and a driven pulley 13.

The V-belt, as shown in FIG. 2, comprises a cog belt having a rubber body 14 defining a plurality of cogs 15 defining the inner compression portion 16 of the belt. The belt body further defines an outer tension portion 17 and a plurality of longitudinally extending tensile cords 18 intermediate the compression and tension portions.

The inner surface of the belt may be provided with a cover fabric 19 and the outer surface thereof may be provided with a similar cover fabric 20. In the illustrated embodiment of FIG. 2, the side edge surfaces 21 of the belt define raw edge surfaces, i.e. no cover fabric is provided thereon.

As further illustrated in FIG. 2, reinforcing elements 22 are provided extending transversely across the belt to provide improved stability and resistance against transverse expansion and deformation of the belt during power transmission operation. In the illustrated embodiment, the reinforcing elements 22 comprise metal rods extending fully transversely across the belt, one each in the respective cogs 15. Resultingly, the opposite end surfaces 23 comprise circular surfaces confronting the opposite sidewall surfaces 24 and 25 of the peripheral groove 26 of the pulley 12,13.

As discussed briefly above, the prior art belts not incorporating the desirable transverse reinforcing elements 22 tend to become deformed during the power drive operation, as illustrated in FIG. 1 of the drawing. As shown in FIG. 3, the reinforcing elements 22 tend to maintain the desired trapezoidal cross-sectional configuration of the belt during the driving operation, thereby substantially improving the drive characteristics and useful life of the belt. The present invention is concerned with the provision of means for effectively preventing wear of the pulley sidewall surfaces 24 and 25 by the exposed portions of the reinforcing elements, such as end surfaces 23 thereof at the side edge surfaces 21 of the belt. The invention comprehends the provision of means for providing lubricant fluid on the end surfaces 23 to solve this vexatious problem.

Figure 6:
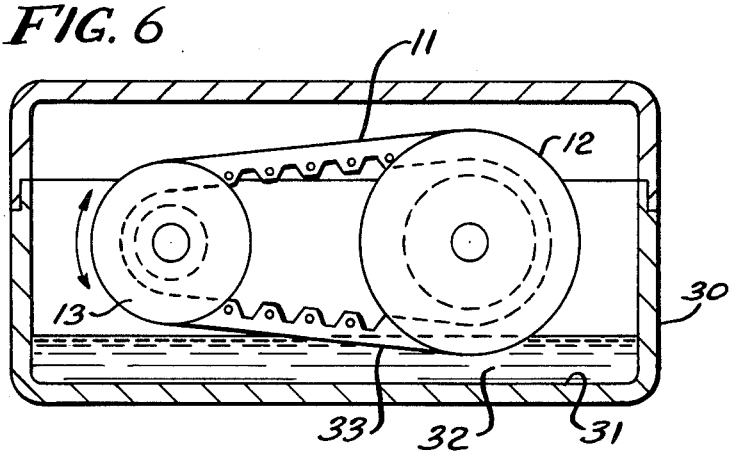
FIG. 6 is a schematic elevation illustrating another form of lubricant fluid-providing means.
Figure 7:
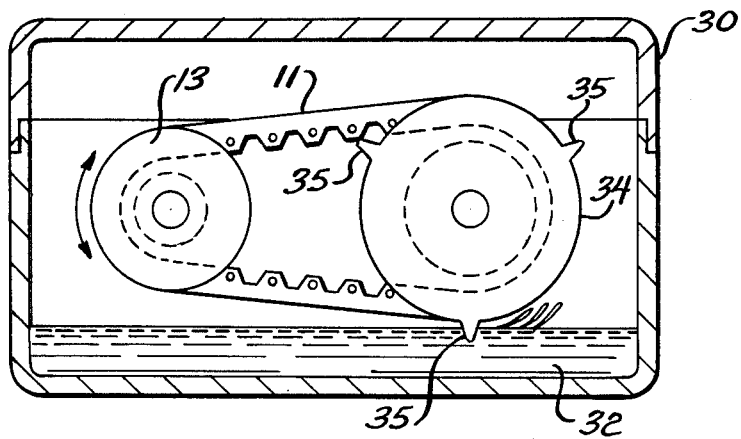
FIG. 7 is a schematic elevation illustrating still another form of lubricant fluid-providing means embodying the invention.

More specifically, the invention comprehends the provision of a thin film of a lubricant fluid, such as oil, on the end surfaces 23 during the drive operation of the power transmission mechanism 10. A number of different systems for providing such lubrication are illustrated in FIGS. 5, 6 and 7. Where the lubricating fluid is oil, it is desirable to form the belt of a oilproof rubber, such as nitrile rubber, acryl rubber, silicone rubber, hypalon rubber, hydrogen-added nitrile rubber, etc. It has been found that the hydrogen-added nitrile rubber provides a particularly advantageous material for use in such a drive system.

The invention comprehends the provision of the lubricating oil as a thin film 27 which may extend along the entire side edge surface 21 of the belt, as well as across the end surfaces 23 of the reinforcing elements, as shown in FIG. 4 of the drawing.

In the embodiment of the mechanism illustrated in FIG. 5, the lubricating oil is delivered onto the cog portion of the belt by a spray device 28 receiving the oil from a suitable reservoir 29 under pressure. The oil sprayed onto the cog portion of the belt is directed onto the belt at the point where the belt is about to enter the driver pulley 12 so as to efficiently flow onto the side edge surfaces in a thin film for providing improved operation of the mechanism.

Referring to the embodiment of FIG. 6, the mechanism may be provided within a housing 30 defining an oil reservoir portion 31 in which a body of the lubricating oil 32 is provided. The level of the lubricating oil is preselected so as to cause a portion 33 of the belt 11 to pass through the body of oil and thereby pick up a thin film thereof on the side edge surfaces.

Further, as shown in FIG. 6, the driver pulley 12 may be disposed so as to extend downwardly into the body of oil, providing further pickup of the lubricating oil in effecting the desired improved operation of the power transmission mechanism.

It is preferable that the belt dip into the oil at a location just prior to its engagement with the driver pulley 12 and that the extent of the dipping of the belt as well as the pulley into the oil is relatively small so as to minimize any drag against the drive mechanism operation. At the same time, the oil acts to minimize heating of the system, providing further improved, long troublefree life thereof.

It has been found that with the arrangement of FIG. 6, the oil is splashed up in an atomized state onto the pulley so as to facilitate the formation of the desired thin film 27 between the reinforcing element surfaces 23 and pulley sidewall surfaces.

Referring to the embodiment of FIG. 7, the driver pulley 34 is provided with a plurality of projections 35 which pass downwardly into the body of oil 33. During high speed operation of the mechanism, the projections throw droplets of the oil upwardly so as to atomize the oil and form the desired thin film 27 between the belt side edge surfaces 21 and pulley groove sidewall surfaces 24 and 25.

In the illustrated embodiments, the introduction of the lubricating oil is disclosed as being effected at the driver pulley. However, it is contemplated within the scope of the invention that the lubrication may be effected at other portions of the system, such as at the driver pulley, within the scope of the invention.

As will be obvious to those skilled in the art, the thickness of the thin film 27 may be suitably controlled by varying the oil viscosity, the lateral pressure between the belt and pulley, and the rotational speed of the system. As discussed above, it is desirable to maintain the thickness of the film relatively small so as to reduce the coefficient of friction and thereby maximize the power transmission efficiency of the mechanism. On the other hand, it is necessary to provide a sufficient thickness to the film so as to assure the prevention of wear of the pulley sidewall surfaces 24 and 25 during high power transmission operation. Thus, the mechanism 10 is advantageously adapted for high power transmission use, such as in motorcycle and farm equipment torque converters and the like.

In the illustrated embodiment, the reinforcing element comprises a metal rod. As will be obvious to those skilled in the art, other forms of transverse reinforcing elements may be utilized within the scope of the invention, including tubular elements, bar elements, and plate-shaped elements, etc.

The improved power transmission mechanism provided by the present invention provides minimum wear of the pulley grooves by the exposed surfaces of the transverse reinforcing elements, while at the same time, the reinforcing elements assure long, troublefree life of the belt itself by maintaining the desirable trapezoidal configuration illustrated in FIG. 2 during high power drive operation.

The invention further provides operation with minimum noise.

Heating of the belt in operation is effectively minimized so as to assure long, troublefree life. Further, the improved mechanism permits removal and installation of the drive belts with improved facility by effectively minimizing wear of the pulley sidewall surfaces. As indicated above, the maintenance of the pulley surface configuration assures an accurately maintained pitch line in the operation of the mechanism, further assuring long, troublefree life.

The foregoing disclosure of specific embodiments is illustrative of the broad inventive concepts comprehended by the invention.

We claim:

1. In a V-belt power transmission mechanism having power transmitting pulleys provided with belt receiving peripheral grooves defining opposed sidewalls, and a V-belt entrained about said pulleys and having exposed side edge surfaces comprising at least in part rubber surfaces facially engaging said groove sidewalls to have functional drive relationship therewith, the improvement comprising:
    means for providing a thin film of lubricant fluid between said belt side edge surfaces and said groove sidewalls for reducing the coefficient of friction therebetween are reducing noise and heating of the V-belt.

2. The V-belt power transmission mechanism of claim 1 wherein said lubricant fluid comprises oil.

3. The V-belt power transmission mechanism of claim 1 wherein said lubricant fluid comprises oil and said V-belt is formed of oil-resistant rubber.

4. The V-belt power transmission mechanism of claim 1 wherein said V-belt comprises a cog belt wherein at least a portion of said side edge surface comprises side edge surfaces of the cogs.

5. The V-belt power transmission mechanism of claim 1 wherein said lubricant fluid providing means comprises means for continuously delivering said fluid onto the belt during operation of the power transmission mechanism.

6. The V-belt power transmission mechanism of claim 1 wherein said lubricant fluid providing means comprises means for continuously delivering said fluid onto the pulley during operation of the power transmission mechanism.

7. The V-belt power transmission mechanism of claim 1 wherein said lubricant fluid providing means comprises means for directing a stream of said lubricant fluid continuously onto at least one of said belt and pulleys during operation of the power transmission mechanism.

8. The V-belt power transmission mechanism of claim 1 wherein said lubricant fluid providing means comprises means for passing at least a portion of said belt through a body of said lubricating fluid during operation of the power transmission mechanism.

9. The V-belt power transmission mechanism of claim 1 wherein said lubricant fluid providing means comprises means for pressing at least a portion of one of said pulleys through a body of said lubricating fluid during operation of the power transmission mechanism.

10. In a V-belt power transmission mechanism having power transmitting pulleys provided with belt receiving peripheral grooves defining opposed sidewalls, and a V-belt entrained about said pulleys and having side edge rubber surfaces facially engaging said groove sidewalls to have functional drive relationship therewith, the improvement comprising:
    reinforcement elements extending transversely across said V-belt and defining ends exposed at said side edge rubber surfaces and engaging said groove sidewalls; and
    means for providing a thin film of lubricant fluid between said belt side edge surfaces and reinforcement element ends, and said groove sidewalls for reducing the coefficient of friction therebetween and reducing noise and heating of the V-belt.

11. The V-belt power transmission mechanism of claim 10 wherein said reinforcement elements comprise rods extending fully transversely across the V-belt.

12. The V-belt power transmission mechanism of claim 10 wherein said V-belt comprises a cog belt having a plurality of longitudinally spaced cogs and said reinforcement elements are disposed in said cogs.

13. The V-belt power transmission mechanism of claim 10 wherein said V-belt comprises a cog belt having a plurality of longitudinally spaced cogs and said reinforcement elements comprise rods extending fully transversely across said cogs.

14. In a V-belt power transmission mechanism having power transmitting pulleys provided with belt receiving peripheral grooves defining opposed sidewalls, and a V-belt entrained about said pulleys and having side edge rubber surfaces facially engaging said groove sidewalls, the improvement comprising:
    reinforcement elements comprising metal rods extending fully transversely across said V-belt and defining ends exposed at said side edge rubber surfaces and engaging said groove sidewalls; and
    means for providing a thin film of lubricant fluid between said belt side edge surfaces and reinforcement element ends, and said groove sidewalls for reducing the coefficient of friction therebetween and reducing noise and heating of the V-belt.

15. In a V-belt power transmission mechanism having power transmitting pulleys provided with belt receiving peripheral grooves defining opposed sidewalls, and a V-belt entrained about said pulleys and having side edge surfaces, the improvement comprising:
    metal elements in said V-belt extending fully thereacross exposed at said side edge surfaces so as to engage the pulley groove sidewalls; and
    means for providing a thin film of lubricant fluid between said metal elements and said pulley groove sidewalls for minimizing wear of the pulley groove sidewalls by said elements during operation of the power transmission mechanism.

16. The V-belt power transmission mechanism of claim 15 wherein said elements comprise metal rods.

17. The V-belt power transmission mechanism of claim 15 wherein said lubricant fluid comprises oil, and said V-belt is formed of oil-resistant rubber.

18. The V-belt power transmission mechanism of claim 15 wherein said elements define circular end faces confronting said pulley sidewalls.

19. The V-belt power transmission mechanism of claim 15 wherein said lubricating fluid is delivered selectively onto (a) said V-belt alone (b) said pulley alone or (c) each of said V-belt and said pulley concurrently.

* * * * *